UNITED STATES PATENT OFFICE.

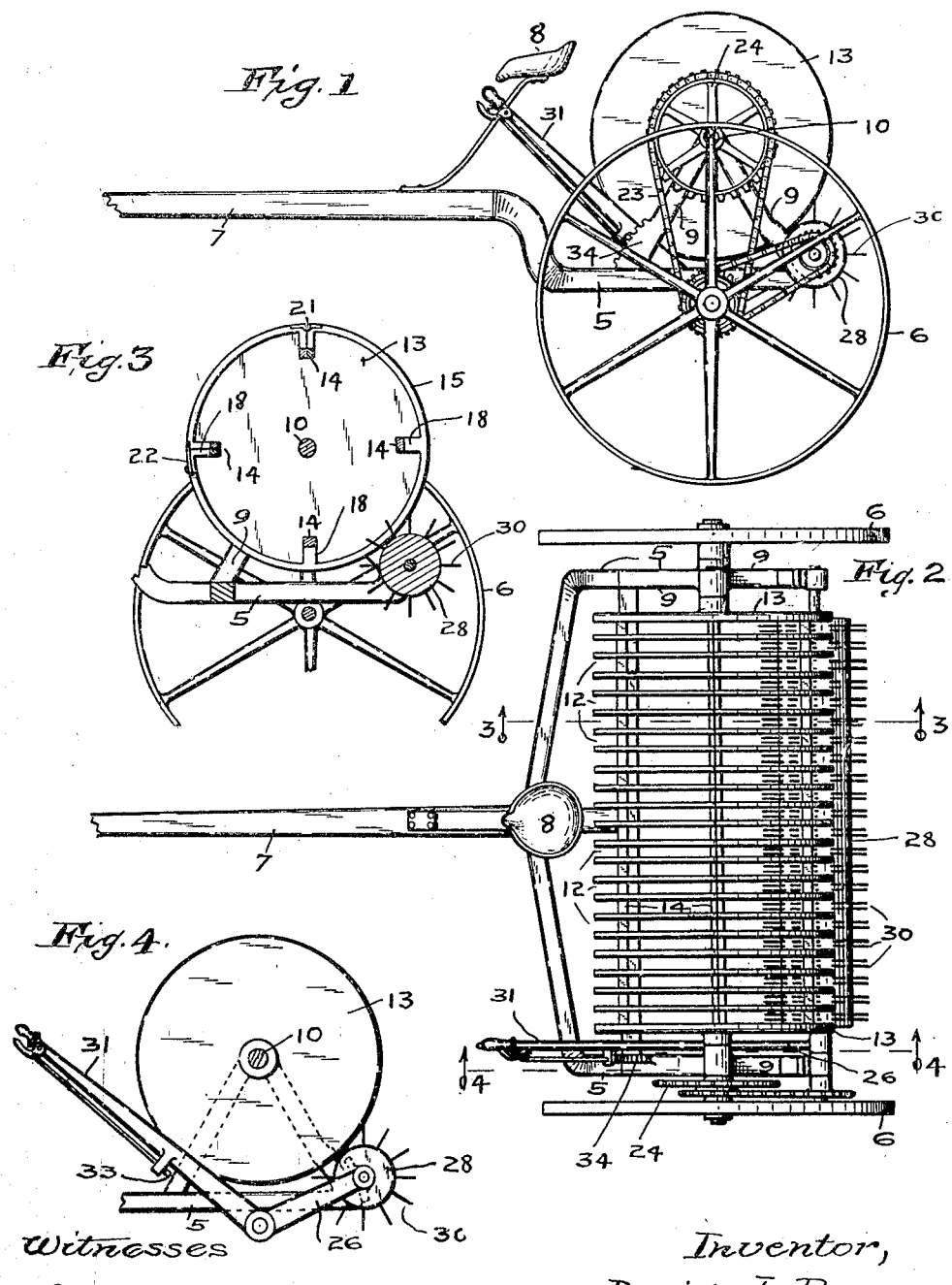

DAVID J. BEEM, OF SPENCER, INDIANA.

MANURE-SPREADER.

No. 920,247.  Specification of Letters Patent.  Patented May 4, 1909.

Application filed June 5, 1908, Serial No. 436,878. Renewed March 1, 1909. Serial No. 480,753.

*To all whom it may concern:*

Be it known that I, DAVID J. BEEM, a citizen of the United States, residing at Spencer, in the county of Owen and State of Indiana, have invented certain new and useful Improvements in Manure-Spreaders, of which the following is a specification.

This invention relates to improvements in machines for spreading manure and the object of the invention is to provide a holder for said fertilizer which will absolutely avoid the packing of that material out of reach of the distributing beaters but will deliver the manure uniformly and regularly to the beaters.

The object also is to provide a machine which will be simple in construction, inexpensive in the cost of manufacture, easy to understand and operate and of light draft.

I accomplish the objects of my invention by the mechanism illustrated in the accompanying drawing, in which—

Figure 1 is a detail in side elevation of my improved machine; Fig. 2 a top plan view of same; Fig. 3 a detail in vertical section on the line 3—3 of Fig. 2, and Fig. 4 a detail in vertical section on the line 4—4 of Fig. 2.

Like characters of reference indicate like parts throughout the several views of the drawing.

5 represents the body-frame of my machine and 6 a pair of wheels mounted on axle-stubs carried by the frame 5.

7 is a tongue to which the draft animals will be hitched and 8 is a seat supported by the tongue upon which the operator will ride.

Supported above the frame 5 by suitable standards 9 is a shaft 10 upon which a reel or drum forming a receptacle for the manure, is mounted. This drum is cylindrical in shape and its sides are provided with a series of circumferential slots 12 for the entrance therethrough of the beater-teeth. In practice the walls of the drum will preferably be formed out of annular slats and these slats will be substantially a series of rims or fellies such as are used for vehicle wheels.

The ends 13 of the drum will be solid and will form the supports for the longitudinal bars 14, here shown as four in number, which bars will provide supports for the slats or fellies 15. In order to place the bars 14 in far enough from the surface of the drum to be out of striking contact with the teeth of the beater it becomes necessary to provide the blocks 18 between the bars 14 and the rim for the attachment of the rim thereto. A section of each rim or felly or slat in the same longitudinal row, is detached from the remainder or body portion of the slat to provide a door through which the drum may be filled. These slat-sections are attached by hinges 21 and their opposite ends are fastened by a catch 22. A sprocket wheel mounted on one of the stub-axles is connected by link-belt 23 with a sprocket wheel 24 mounted on the shaft 10 thereby affording a means for the rotation of the drum as the machine moves forward across a field. Pivotally mounted on said stub-axles at each end of the machine are the arms 26 and at the outer ends of these arms at the rear of the machine the beater roll 28 is mounted. This roll has the teeth 30 placed thereon so as to enter the manure carrying drum through slots 12 in the sides of said drum. A lever extension 31 at one side of the machine provides means whereby the arms 26 and through said arms the beater 28 may be raised or lowered in the arc of a circle. This movement of the beater roll brings it toward or away from the manure-carrying drum so as to cause the beater teeth 30 to enter the drum a correspondingly greater or less distance. This obviously provides a means for regulating the quantity of fertilizer removed from the drum by the beater teeth.

As the beater is located at the rear of the machine and at the bottom of the drum the fertilizer is discharged upon the ground at the rear of the machine and as the manure is taken out of the drum by the beater teeth the mass above is brought into contact with the beater teeth by the rotation of the drum. The bringing of the fertilizer into the path of the beater teeth is also facilitated by gravity which causes the material to fall in the direction of said beater.

A given adjustment of the beater is retained by means of dog 33 carried by lever 31, which enters the teeth of rack 34 on one of the standards 9.

Having thus fully described my invention what I claim as new and wish to secure by Letters Patent of the United States, is—

1. In a manure spreader, a receptacle to contain the manure to be spread consisting of a horizontal revolving drum the periphery of said drum being provided with a series of annular slots, and a revolving beater-roll having teeth which enter the slots of the drum.

2. In a manure spreader, a manure holding receptacle comprising a horizontally mounted revolving drum the sides of said drum being formed out of a series of annular slats in combination with a revolving beater-roll located at the bottom of the drum, said beater-roll having teeth which enter the drum between the slats of the latter.

3. In a manure spreader, a manure receptacle comprising a horizontal revolving drum having annularly slotted sides in combination with a beater-roll mounted outside of the drum parallel with and adjacent thereto, said beater-roll having teeth entering the drum through the slots in the latter, means for rotating the beater-roll and means for varying its distance from the drum to vary the extension into the drum of the beater teeth.

4. In a manure spreader, a frame mounted on two wheels, a drum forming a receptacle for manure mounted horizontally above the frame said drum having its periphery formed of a series of annular slats, means for introducing the manure into the drum, means connected with the said wheels for rotating the drum, a beater-roll mounted below the drum and having teeth to enter the drum between the slats of the latter, means for regulating the distance of the beater-roll from the drum and means for rotating the beater-roll.

5. In a manure spreader, a receptacle for the manure consisting of a horizontal cylindrical revolving drum, the periphery of which has a series of annular slots for the entrance of beater-teeth therethrough, and means in said drum for opening it to permit the drum to be charged with manure.

In witness whereof, I, have hereunto set my hand and seal at Indianapolis, Indiana, this 29th day of May, A. D. one thousand nine hundred and eight.

DAVID J. BEEM. [L. S.]

Witnesses:
L. B. WOERNER,
F. W. WOERNER.